United States Patent [19]
Jolly

[11] Patent Number: 5,147,109
[45] Date of Patent: Sep. 15, 1992

[54] CAR SEAT APPARATUS

[76] Inventor: Jack L. Jolly, Rte. 1 Box 800, Esparto, Calif. 95627

[21] Appl. No.: 772,104

[22] Filed: Oct. 7, 1991

[51] Int. Cl.⁵ .............................................. A47D 1/10
[52] U.S. Cl. ................................... 297/217; 297/181; 297/250
[58] Field of Search ................. 297/217, 186, 181, 250

[56] References Cited

U.S. PATENT DOCUMENTS

| | | | |
|---|---|---|---|
| 3,948,379 | 4/1976 | Warner | 297/217 X |
| 4,695,092 | 9/1987 | Hittie | 297/181 X |
| 4,759,588 | 7/1988 | Husnik | 297/181 X |
| 4,909,573 | 3/1990 | Barry et al. | 297/181 X |
| 4,979,777 | 12/1990 | Takada | 297/217 X |
| 4,984,849 | 1/1991 | Rist | 297/250 X |

FOREIGN PATENT DOCUMENTS 214951  3/1987  European Pat. Off. ............ 297/217

Primary Examiner—Jose V. Chen
Attorney, Agent, or Firm—Leon Gilden

[57] ABSTRACT

A child's car seat is arranged for securement relative to an associated transport vehicle, including a base and back portion, with an audible reproduction mechanism mounted within the base portion and operative through a sound directing conduit through the back portion into a head simulation of a representative animal configuration to assist in inducing a child to be secured within the associated car seat apparatus.

3 Claims, 4 Drawing Sheets

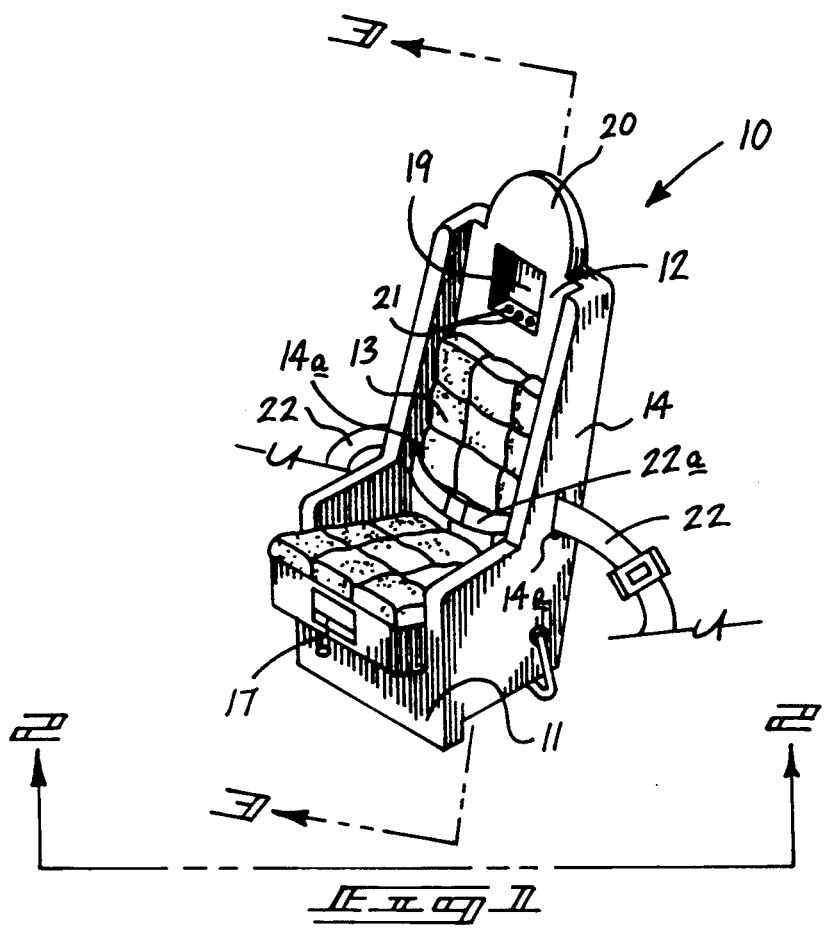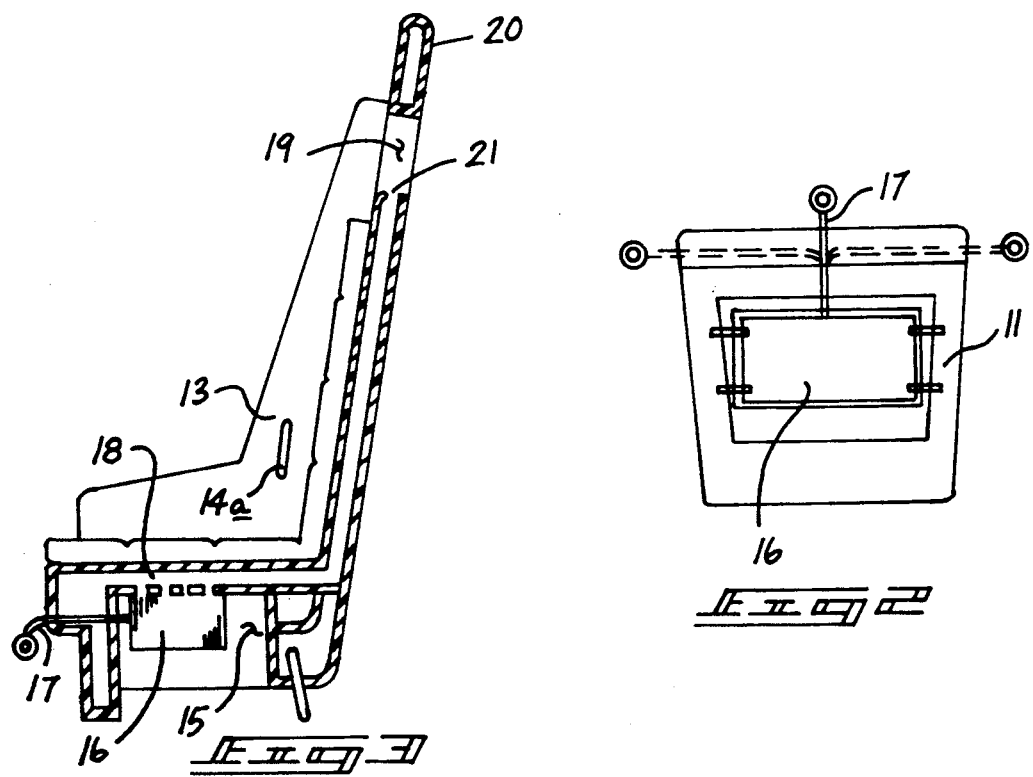

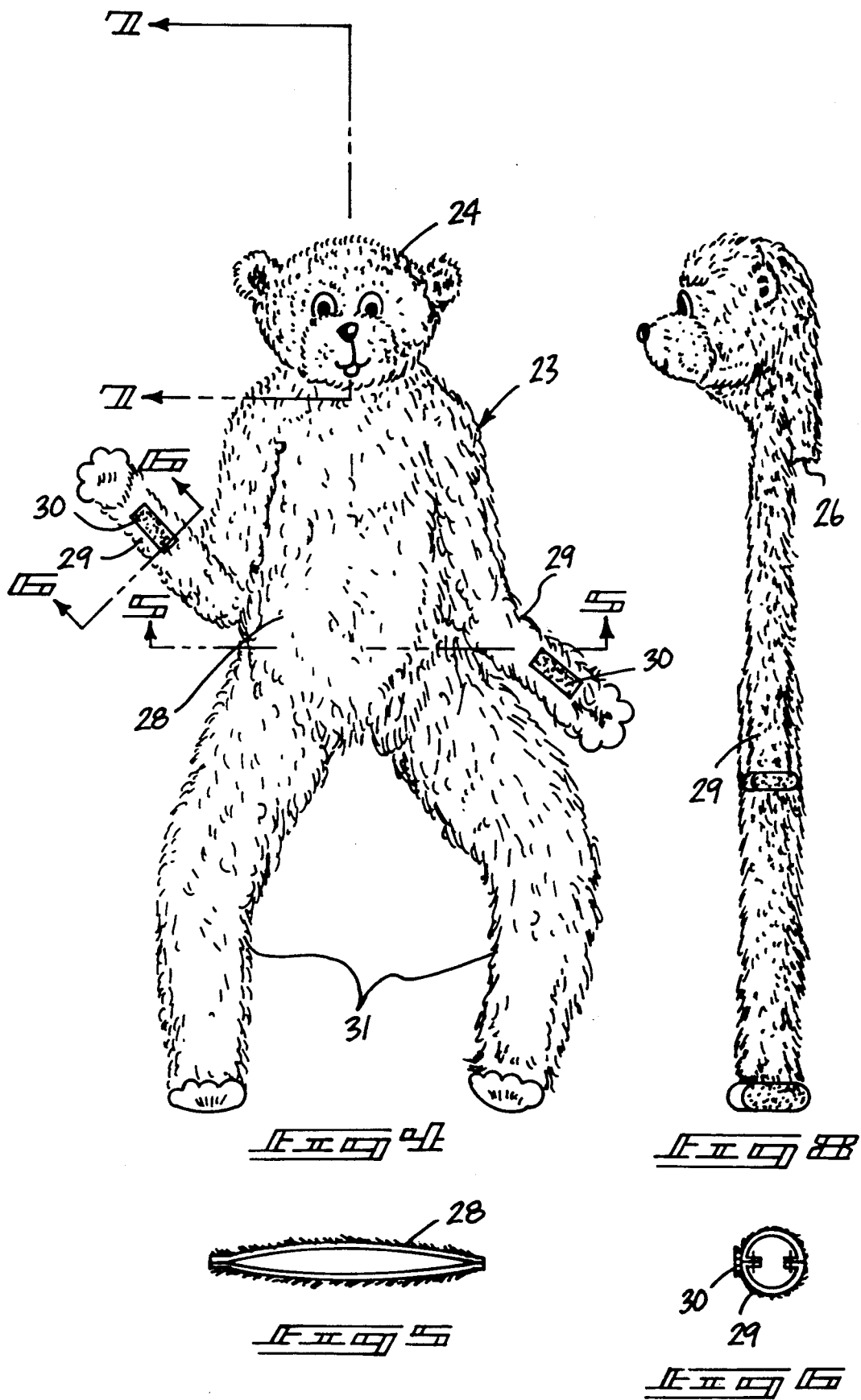

CAR SEAT APPARATUS

BACKGROUND OF THE INVENTION

1. Field of the Invention

The field of invention relates to car seat apparatus, and more particularly pertains to a new and improved car seat apparatus wherein the same is arranged for utilizing a sound reproducing mechanism in association with an animal caricature for enhancing ease of securement of a child within a car seat structure.

2. Description of the Prior Art

Car seat apparatus of various types have been utilized throughout the prior art for the safety, as well as adherence to local legislation. Frequently children are disinclined to be secured within a car seat organization, wherein the instant invention attempts to overcome deficiencies of the prior art by providing for an amusement and entertaining structure to induce a child to be secured within an associated car seat structure. Prior art car seat structure as exemplified in the prior art is set forth in U.S. Pat. No. 4,743,064 to Takizawa wherein a child's car seat is arranged for forward and rearward mounting relative to an associated seat.

U S. Pat. No. 4,858,997 to Shubin sets forth a child's car seat, wherein the seat belt structure is arranged for operative association relative to a pivoted tray mounted to the car seat structure.

As such, it may be appreciated that there continues to be a need for a new and improved car seat apparatus as set forth by the instant invention which addresses both the problems of ease of use as well as effectiveness in construction and in this respect, the present invention substantially fulfills this need.

SUMMARY OF THE INVENTION

In view of the foregoing disadvantages inherent in the known types of car seat apparatus now present in the prior art, the present invention provides a car seat apparatus wherein the same utilizes a sound reproducing mechanism to induce a child to be secured and harnessed within the car seat structure. As such, the general purpose of the present invention, which will be described subsequently in greater detail, is to provide a new and improved car seat apparatus which has all the advantages of the prior art car seat apparatus and none of the disadvantages.

To attain this, the present invention provides a child's car seat arranged for securement relative to an associated transport vehicle, including a base and back portion, with an audible reproduction mechanism mounted within the base portion and operative through a sound directing conduit through the back portion into a head simulation of a representative animal configuration to assist in inducing a child to be secured within the associated car seat apparatus.

My invention resides not in any one of these features per se, but rather in the particular combination of all of them herein disclosed and claimed and it is distinguished from the prior art in this particular combination of all of its structures for the functions specified.

There has thus been outlined, rather broadly, the more important features of the invention in order that the detailed description thereof that follows may be better understood, and in order that the present contribution to the art may be better appreciated. There are, of course, additional features of the invention that will be described hereinafter and which will form the subject matter of the claims appended hereto. Those skilled in the art will appreciate that the conception, upon which this disclosure is based, may readily be utilized as a basis for the designing of other structures, methods and systems for carrying out the several purposes of the present invention. It is important, therefore, that the claims be regarded as including such equivalent constructions insofar as they do not depart from the spirit and scope of the present invention.

Further, the purpose of the foregoing abstract is to enable the U.S. Patent and Trademark Office and the public generally, and especially the scientists, engineers and practitioners in the art who are not familiar with patent or legal terms or phraseology, to determine quickly from a cursory inspection the nature and essence of the technical disclosure of the application. The abstract is neither intended to define the invention of the application, which is measured by the claims, nor is it intended to be limiting as to the scope of the invention in any way.

It is therefore an object of the present invention to provide a new and improved car seat apparatus which has all the advantages of the prior art car seat apparatus and none of the disadvantages.

It is another object of the present invention to provide a new and improved car seat apparatus which may be easily and efficiently manufactured and marketed.

It is a further object of the present invention to provide a new and improved car seat apparatus which is of a durable and reliable construction.

An even further object of the present invention is to provide a new and improved car seat apparatus which is susceptible of a low cost of manufacture with regard to both materials and labor, and which accordingly is then susceptible of low prices of sale to the consuming public, thereby making such car seat apparatus economically available to the buying public.

Still yet another object of the present invention is to provide a new and improved car seat apparatus which provides in the apparatuses and methods of the prior art some of the advantages thereof, while simultaneously overcoming some of the disadvantages normally associated therewith.

These together with other objects of the invention, along with the various features of novelty which characterize the invention, are pointed out with particularity in the claims annexed to and forming a part of this disclosure. For a better understanding of the invention, its operating advantages and the specific objects attained by its uses, reference should be had to the accompanying drawings and descriptive matter in which there is illustrated preferred embodiments of the invention.

BRIEF DESCRIPTION OF THE DRAWINGS

The invention will be better understood and objects other than those set forth above will become apparent when consideration is given to the following detailed description thereof. Such description makes reference to the annexed drawings wherein:

FIG. 1 is an isometric illustration of the instant invention.

FIG. 2 is an orthographic view, taken along the lines 2—2 of FIG. 1 in the direction indicated by the arrows.

FIG. 3 is an orthographic view, taken along the lines 3—3 of FIG. 1 in the direction indicated by the arrows.

FIG. 4 is an orthographic frontal view, taken in elevation, of an animal representation member utilized by the invention.

FIG. 5 is an orthographic view, taken along the lines 5—5 of FIG. 4 in the direction indicated by the arrows.

FIG. 6 is an orthographic view, taken along the lines 6—6 of FIG. 4 in the direction indicated by the arrows.

FIG. 8 is an orthographic side view of the animal representation member.

DESCRIPTION OF THE PREFERRED EMBODIMENT

Figure 7:
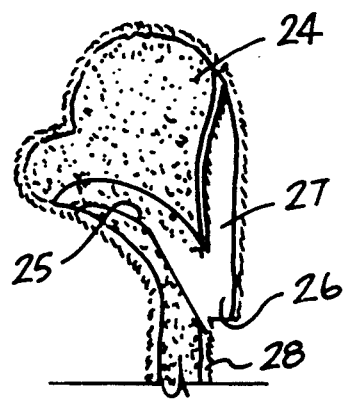
FIG. 7 is an orthographic view, taken along the lines 7—7 of FIG. 4 in the direction indicated by the arrows.
Figure 9:
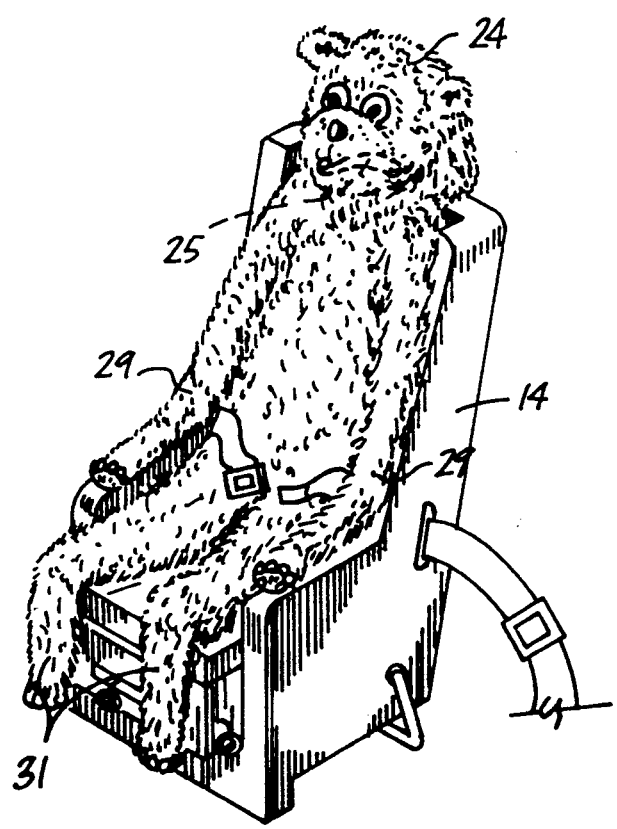
FIG. 9 an isometric illustration of the animal representation member mounted in association with the car seat structure.

With reference now to the drawings, and in particular to FIGS. 1 to 11 thereof, a new and improved car seat apparatus embodying the principles and concepts of the present invention and generally designated by the reference numeral 10 will be described.

More specifically, the car seat apparatus 10 of the instant invention, as illustrated in FIG. 1, essentially comprises a base portion 11 mounted to a back portion 12 receiving an "L" shaped cushion 13 to overlie a top surface of the base and back portion, with the seat apparatus further including side walls 14 to contain the "L" shaped cushion within the base and back portions, as illustrated. Side wall slots 14a receive a vehicular seat belt member 22 therethrough that is directed forwardly of the "L" shaped cushion 13 to provide for a car seat security belt portion 22a. A base cavity 15 is defined within the base portion 11, and includes a sound reproducing mechanism 16, such as a tape player, a mechanical reproduction device, or the like. An actuator pull cord 17 is directed through a forward wall of the base portion 11 to effect selective actuation of the sound reproducing mechanism 16. The sound reproducing mechanism 16 fixedly mounted within the base cavity 15 is in audible communication with a sound directing conduit 18 contained within the base portion and back portion 11, as illustrated in FIG. 3, and terminates in a sound chamber cavity 19 formed adjacent an upper terminal end of the back portion below a back portion projecting plate 20 extending above the sound chamber cavity 19 in communication with the sound directing conduit 18 through sound directing apertures 21. Reference to the FIGS. 4-9 illustrate the animal representation 23 utilized by the invention, including a head portion 24 mounted to a hollow body member 28, which in turn includes arm members 29 and leg members 31. The body member 28 is arranged for coextensive mounting over the "L" shaped cushion 13, with the arm members 29 each pivotally mounted to the body member 28 and including cooperating hook and loop fastener patches 30 for securement about an infant to provide for a soothing surrounding relationship relative to the infant or child to enhance a child's comfort within the seat organization. The head portion 24 includes a head portion pocket 27 mounted to a rear surface of the head portion, as illustrated in FIG. 7, for receiving the back portion projecting plate 20 therewithin directed into the pocket through a pocket entrance 26 formed at a lower terminal end of the pocket 27 adjacent an intersection of the head portion and the body member 24 and 20 respectively of the animal representation member 23. A head portion sound directing conduit 25 is directed from a forward surface of the head portion 24 rearwardly into an intersection with the pocket entrance 26 to direct audible sound from the sound reproducing mechanism 16 directed into the sound chamber cavity 19 and subsequently into the head portion sound directing conduit 25. In this manner, a message of a desired type may be provided to induce a child to be secured within the organization when the actuator pull cord 17 is manipulated.

Figure 10:
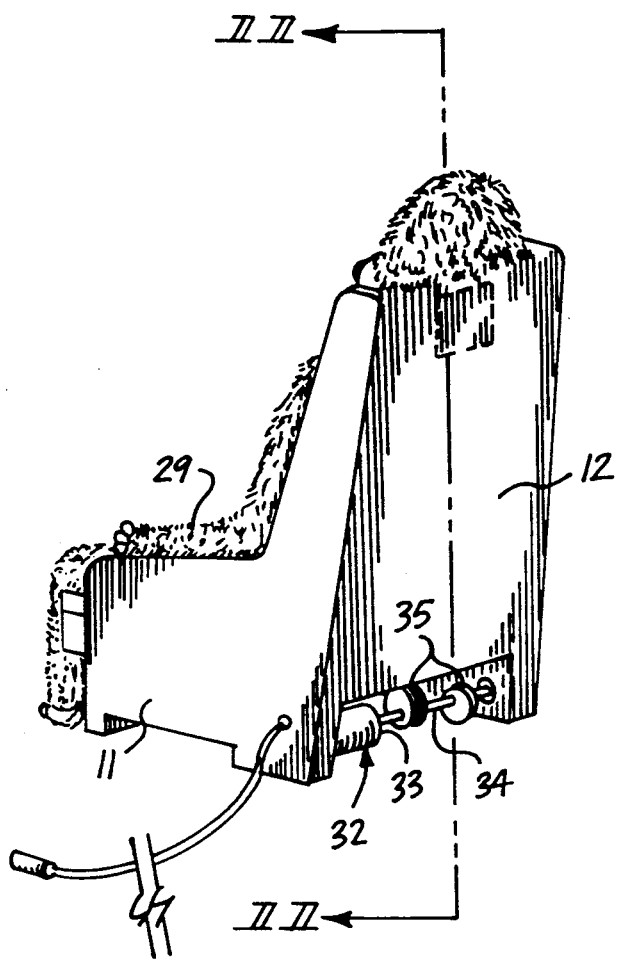
FIG. 10 is an isometric illustration of a modified aspect of the invention.
Figure 11:
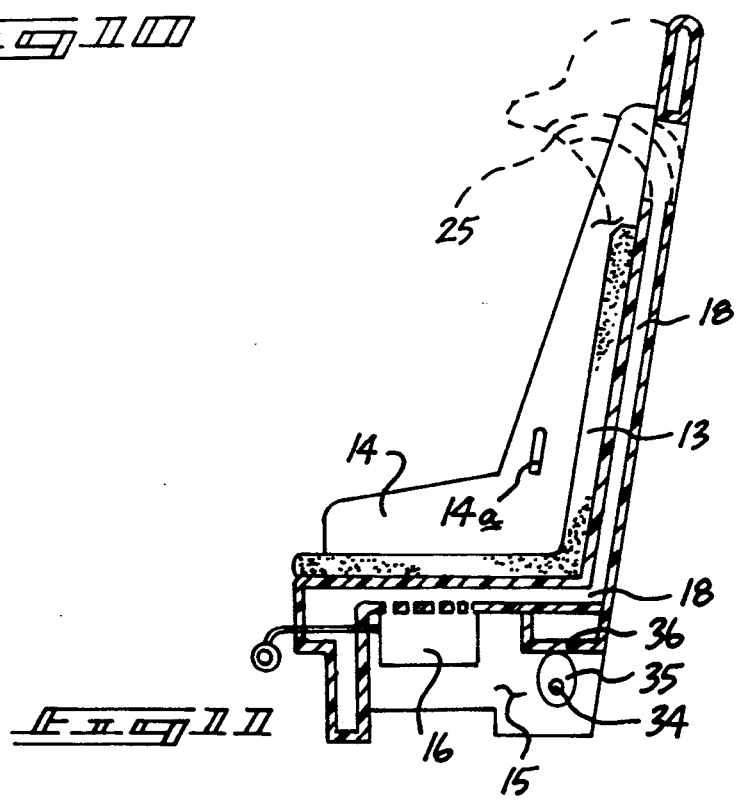
FIG. 11 is an orthographic view, taken along the lines 11—11 of FIG. 10 in the direction indicated by the arrows.

The FIGS. 10 and 11 illustrate the use of a vibratory member 32 utilized by the organization to effect a soothing vibration directed through the base and back portions 11 and 12. The vibratory member 32 includes a drive motor 33 mounted within the base cavity 15, including an output shaft 34, with a plurality of deformable cam members 35 mounted in an offset relationship relative to one another mounted along each cam axis to the output shaft 34 within the base cavity 15. A base cavity interior rear wall boss 36 is arranged for impact with each of the cam members 35 to direct vibration through the organization in use.

As to the manner of usage and operation of the instant invention, the same should be apparent from the above disclosure, and accordingly no further discussion relative to the manner of usage and operation of the instant invention shall be provided.

With respect to the above description then, it is to be realized that the optimum dimensional relationships for the parts of the invention, to include variations in size, materials, shape, form, function and manner of operation, assembly and use, are deemed readily apparent and obvious to one skilled in the art, and all eguivalent relationships to those illustrated in the drawings and described in the specification are intended to be encompassed by the present invention.

Therefore, the foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, falling within the scope of the invention.

What is claimed as being new and desired to be protected by Letters Patent of the United States is as follows:

1. A car seat apparatus, comprising,
   a base portion fixedly mounted to a back portion, wherein the base portion and back portion each include respective right and left side walls defining a seat cavity, the seat cavity receiving an L-shaped cushion therewithin, and
   the side walls including aligned side wall slots for receiving a vehicular seat belt therethrough, and
   the base portion including a base cavity, the base cavity including a sound reproducing mechanism contained therewithin, and
   the sound reproducing mechanism including an actuator pull cord directed through the base portion for selective actuation of the sound reproducing mechanism, and
   a sound directing conduit is directed coextensively from the base portion through the back portion, and the sound reproducing mechanism is mounted fixedly adjacent the sound directing conduit, and a matrix of apertures communicating between the sound reproducing mechanism and the sound directing conduit to direct audible signals into the sound directing conduit, and the sound directing conduit directed through the back portion terminates in a sound chamber cavity formed within the back portion adjacent an upper terminal end of the back portion, and a back portion projecting plate coextensive with the back portion extending above the chamber cavity, and a flexible animal representation member mounted to coextensively overlie the base portion and the back portion positioned forwardly of the sound chamber cavity, and the animal representation member includes a head portion, the head portion mounted to a body member, the body member including a plurality of arm members and a plurality of leg members, the arm members positioned along the side walls, and the leg members extending forwardly along the base portion, and the head portion includes a pocket mounted to the rear surface of the head portion, the pocket including a pocket entrance formed at a lower terminal end of the pocket, and the back portion projecting plate complementarily received within the pocket mounting the animal representation member to the back portion, and the head portion includes a head portion sound directing conduit directed from the forward surface of the head portion extending through the rear surface of the head portion at an intersection of the head portion with the pocket entrance, and the pocket entrance positioned adjacent the sound chamber cavity to direct an audible signal from the sound chamber cavity through the head portion sound directing conduit.

2. An apparatus as set forth in claim 1 wherein the arm members each include cooperative hook and loop fastener patches arranged for securement of the arm members about an individual mounted on the animal representation member.

3. An apparatus as set forth in claim 2 including a vibration assembly mounted within the base cavity, the base cavity including a base cavity interior rear wall boss, and the vibration member including a drive motor, the drive motor fixedly mounted within the base cavity, the drive motor including an output shaft, the output shaft including a plurality of deformable cam members offset relative to one another arranged for impact with the base cavity interior rear wall boss.

* * * * *